US008011864B2

(12) United States Patent
Olgac

(10) Patent No.: US 8,011,864 B2
(45) Date of Patent: Sep. 6, 2011

(54) METHOD FOR FACILITATING CHATTER STABILITY MAPPING IN A SIMULTANEOUS MACHINING APPLICATION

(75) Inventor: Nejat Olgac, Coventry, CT (US)

(73) Assignee: University of Connecticut, Farmington, CT (US)

( * ) Notice: Subject to any disclaimer, the term of this patent is extended or adjusted under 35 U.S.C. 154(b) by 1370 days.

(21) Appl. No.: 11/439,411

(22) Filed: May 23, 2006

(65) Prior Publication Data

US 2006/0271231 A1   Nov. 30, 2006

Related U.S. Application Data

(60) Provisional application No. 60/684,915, filed on May 26, 2005.

(51) Int. Cl.
*B23Q 11/00* (2006.01)
*G06F 19/00* (2006.01)
(52) U.S. Cl. .......................... 409/141; 82/163; 700/174
(58) Field of Classification Search .................. 409/131, 409/132, 141, 80; 29/56.5; 706/12, 13; 700/174; 73/660; 82/1.11, 118, 163
See application file for complete search history.

(56) References Cited

U.S. PATENT DOCUMENTS

| | | | | | |
|---|---|---|---|---|---|
| 1,787,337 | A | * | 12/1930 | Booth | 451/242 |
| 1,924,593 | A | * | 8/1933 | Binns | 451/242 |
| 3,967,515 | A | * | 7/1976 | Nachtigal et al. | 82/118 |
| 4,047,469 | A | * | 9/1977 | Sakata | 82/1.11 |
| 4,604,834 | A | * | 8/1986 | Thompson | 451/5 |
| 4,759,243 | A | * | 7/1988 | Thompson | 82/1.11 |
| 5,170,358 | A | * | 12/1992 | Delio | 700/177 |
| 5,518,347 | A | * | 5/1996 | Cobb, Jr. | 409/141 |
| 5,643,051 | A | * | 7/1997 | Zhou et al. | 451/11 |
| 5,700,116 | A | * | 12/1997 | Cobb, Jr. | 409/141 |
| 5,876,155 | A | * | 3/1999 | Link et al. | 408/1 R |
| 5,913,955 | A | * | 6/1999 | Redmond et al. | 82/1.11 |
| 5,957,016 | A | * | 9/1999 | Segalman et al. | 82/1.11 |
| 6,085,121 | A | * | 7/2000 | Stern | 700/174 |

(Continued)

FOREIGN PATENT DOCUMENTS

WO   WO 2006127709 A2 * 11/2006

OTHER PUBLICATIONS

Merchant, "Basic Mechanics of the Metal-Cutting Process," *ASME Journal of Applied Mechanics*, vol. 66, pp. A-168, 1944.

(Continued)

*Primary Examiner* — Jason Daniel Prone
(74) *Attorney, Agent, or Firm* — McCarter & English, LLP

(57) ABSTRACT

Systems and methods are provided for use in assessing the stability of simultaneous machining (SM) dynamics (which is also known as parallel machining). In SM, multiple cutters, which are generally driven by multiple spindles at different speeds, operate on the same work-piece. In an alternative implementation of SM, single milling cutters with non-uniformly distributed cutter flutes operate on a work-piece. When SM is optimized in the sense of maximizing the rate of metal removal constrained with or by the machined surface quality, "chatter instability" phenomenon appears. The present disclosure declares the complete stability picture of SM chatter within a mathematical framework of multiple time-delay systems (MTDS). A cluster treatment of characteristic roots (CTCR) procedure determines the regions of stability completely in the domain of the spindle speeds for varying chip thickness, thereby replicating the well-known "stability lobes" concept of STM for simultaneous machining.

19 Claims, 7 Drawing Sheets

Stability regions for 4 mm axial depth-of-cut, with four-flute cutter milling on Al 356 (Kernel: thick lines, Offspring: thin lines, stable zones: shaded)

Chatter frequencies (exhaustive) [rad/s] vs. the Kernel ($\tau_1$, $\tau_2$)

U.S. PATENT DOCUMENTS

| | | | |
|---|---|---|---|
| 6,148,248 A * | 11/2000 | Sun et al. | 700/164 |
| 6,189,426 B1 * | 2/2001 | Segalman et al. | 409/141 |
| 6,241,435 B1 * | 6/2001 | Huang et al. | 409/141 |
| 6,349,600 B1 * | 2/2002 | Davies et al. | 73/660 |
| 6,873,722 B2 * | 3/2005 | Hercke et al. | 700/175 |
| 6,886,436 B2 * | 5/2005 | Forster et al. | 82/1.11 |
| 6,993,410 B2 * | 1/2006 | Esterling | 73/660 |
| 7,016,799 B2 * | 3/2006 | Dondi | 702/104 |
| 7,225,657 B2 * | 6/2007 | Slawinski | 72/245 |
| 7,381,017 B2 * | 6/2008 | Wang et al. | 700/280 |
| 7,540,697 B2 * | 6/2009 | Wang et al. | 409/141 |
| 2002/0146296 A1 | 10/2002 | Schmitz et al. | |
| 2003/0200188 A1 * | 10/2003 | Moghaddam | 706/25 |
| 2005/0021265 A1 | 1/2005 | Esterling | |
| 2006/0159538 A1 * | 7/2006 | Wang et al. | 409/131 |
| 2006/0271231 A1 * | 11/2006 | Olgac | 700/159 |
| 2008/0089749 A1 * | 4/2008 | Wells et al. | 409/131 |
| 2009/0187270 A1 * | 7/2009 | Hoefler | 73/660 |
| 2010/0104388 A1 * | 4/2010 | Suzuki et al. | 409/131 |

OTHER PUBLICATIONS

Doi, et al., "Chatter Vibration of Lathe Tools," *Transactions of ASME*, vol. 78, pp. 1127, 1956.

Tobias, *Machine Tool Vibration*: Wiley, NY, 1961.

Tlusty, *Machine Dynamics, Handbook of High Speed Machining Technology*: Chapman and Hall, NY, 1985.

Merritt, "Theory of Self Excited Machine Tool Chatter," *Journal of Engineering for Industry*, pp. 447, 1965.

Kegg, "Cutting Dynamics in Machine Tool Chatter," *Journal of Engineering for Industry*, pp. 464, 1965.

Smith, et al., "Efficient Simulation Program for Chatter in Milling," *Annals of the CIRP*, vol. 42, 1993.

Smith et al., "Update on High Speed Milling Dynamics," *Tran. ASME, J. Of Engineering for Industry*, 1990.

Olgac, et al., "A New Perspective and Analysis for Regenerative Machine Tool Chatter," *International Journal of Machine Tools & Manufacture*, vol. 38, pp. 783-798, 1998.

Altintas, et al., "Analytical Stability Prediction and Design of Variable Pitch Cutters," *ASME Journal of Manufacturing Science and Engineering*, vol. 121, pp. 173-178, 1999.

Hsu, "Application of the Tau-Decomposition Method to Dynamical Systems Subjected to Retarded Follower Forces," *ASME Journal of Applied Mechanics*, vol. 37, pp. 258-266, 1970.

Hale, et al., "Global Geometry of the Stable Regions for Two Delay Differential Equations," *Journal of Mathematical Analysis and Applications*, vol. 178, pp. 344-362, 1993.

Niculescu, "On Delay Robustness Analysis of a Simple Control Algorithm in High-Speed Networks," *Automatica*, vol. 38, pp. 885-889, 2002.

Stepan, *Retarded Dynamical Systems: Stability and Characteristic Function*. New York: Longman Scientific & Technical, co-publisher John Wiley & Sons Inc., US., 1989.

Hsu, et al., "Stability Charts for Second-Order Dynamical Systems with Time Lag," *ASME Journal of Applied Mechanics*, vol. 33, pp. 119-124, 1966.

Chen, et al., "A New Method for Computing Delay Margins for Stability of Linear Delay Systems," *Systems & Control Letters*, vol. 26, pp. 107-117, 1995.

Cooke, et al., "On Zeros of Some Transcendental Equations," *Funkcialaj Ekvacioj*, vol. 29, pp. 77-90, 1986.

Rekasius, "A Stability Test for Systems with Delays," Presented at Proc. Joint Automatic Control Conf., Paper No. TP9-A, 1980.

Sipahi, et al., "A New Perspective for Time Delayed Control Systems with Application to Vibration Suppression," Presented at ASME-IMECE, No. DSC 33535, Best Student Paper Award, New Orleans, L.A., 2002.

Sipahi, et al., "Degenerate Cases in Using Direct Method," *Transaction of ASME, Journal of Dynamic Systems, Measurement, and Control*, vol. 125, pp. 194-201, 2003.

Sipahi, et al., "Active Vibration Suppression with Time Delayed Feedback," *ASME J. of Vibration and Acoustics*, vol. 125, pp. 384-388, 2003.

Olgac, et al., "An Exact Method for the Stability Analysis of Time Delayed LTI Systems," *IEEE Transactions on Automatic Control*, vol. 47, pp. 793-797, 2002.

Olgac, et al., "A Practical Method for Analyzing the Stability of Neutral Type LTI-Time Delayed Systems," *Automatica*, vol. 40, pp. 847-853, 2004.

Lazoglu, et al., "Dynamics of the Simultaneous Turning Process," *Trans. of North American Manufacturing Res. Ins. of SME*, vol. 26, pp. 135-140, 1998.

Feldwisch, "Use of Multi-Spindle Turning Automatics," *IPE International, Industrial and Production Engineering*, vol. 7, pp. 64-68, 1983.

Carland, "2 Spindle are Better Than 1," *Cutting Tool Engineering*, 1997.

Allcock, "Turning Towards Fixed-Head 'Multis'," *Machinery and Production Engineering*, pp. 47-54, 1995.

Koepfer, "Can This New CNC Multispindle Work for Your Shop?," *Modern Machine Shop*, vol. 69, pp. 78-85, 1996.

Kuo, *Automatic Control Systems*: Prentice Hall, 1987.

Phillips et al., *Feedback Control Systems*: Prentice-Hall, Englewood Cliffs, 1988.

MacDonald, "An Interference Effect of Independent Delays," *IEE Proceedings*, vol. 134, pp. 38-42, 1987.

Sipahi et al., "A Novel Stability Study on Multiple Time-Delay Systems (MTDS) Using the Root Clustering Paradigm," American Control Conference, Boston, MA, Jun. 2004, FrP08.2.

Olgac, et al., "Chatter Stability Mapping for Simultaneous Machining", ASME J. of Manufactauring Science and Engineering, 127(4), pp. 791-800, 2005.

PCT International Search Report dated Jul. 25, 2007.

\* cited by examiner

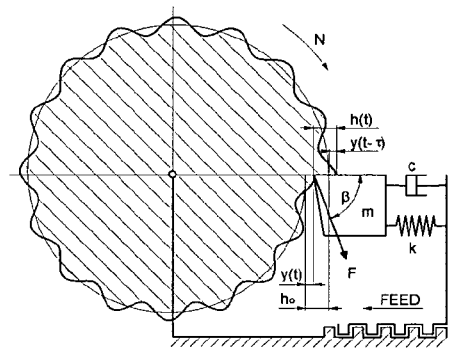
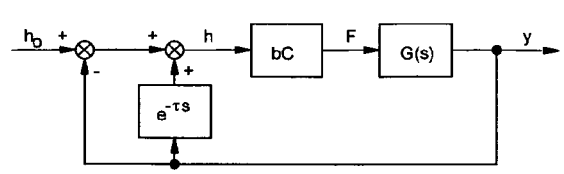
FIGURE 1
FIGURE 2
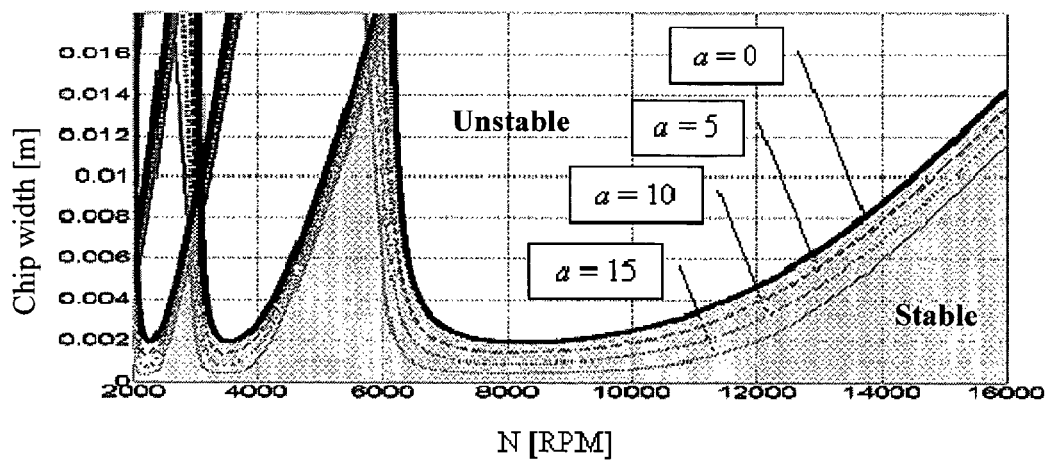
FIGURE 3

Stability regions for 4 mm axial depth-of-cut, with four-flute cutter milling on Al 356 (Kernel: thick lines, Offspring: thin lines, stable zones: shaded)

Chatter frequencies (exhaustive) [rad/s] vs. the Kernel ($\tau_1$, $\tau_2$)

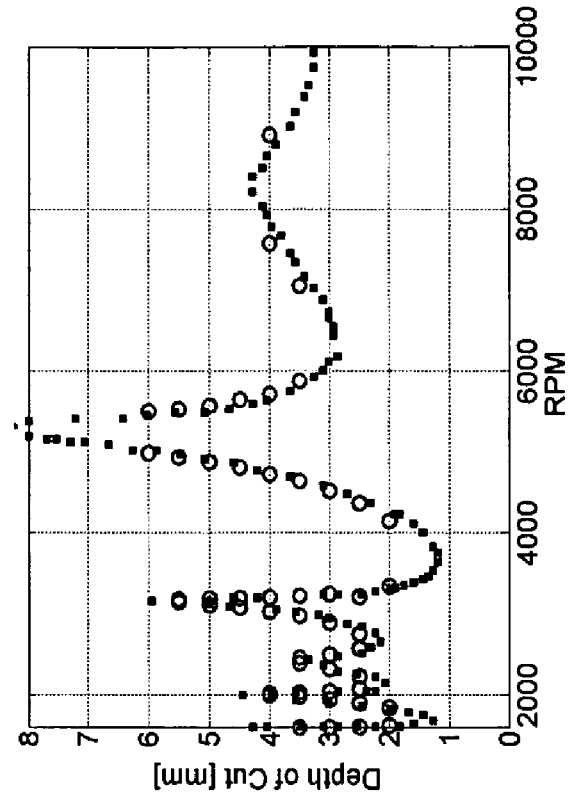
Figure 8b. Comparison of CTCR (circle) and [33, Fig 2] for pitch ratio = 11/7.
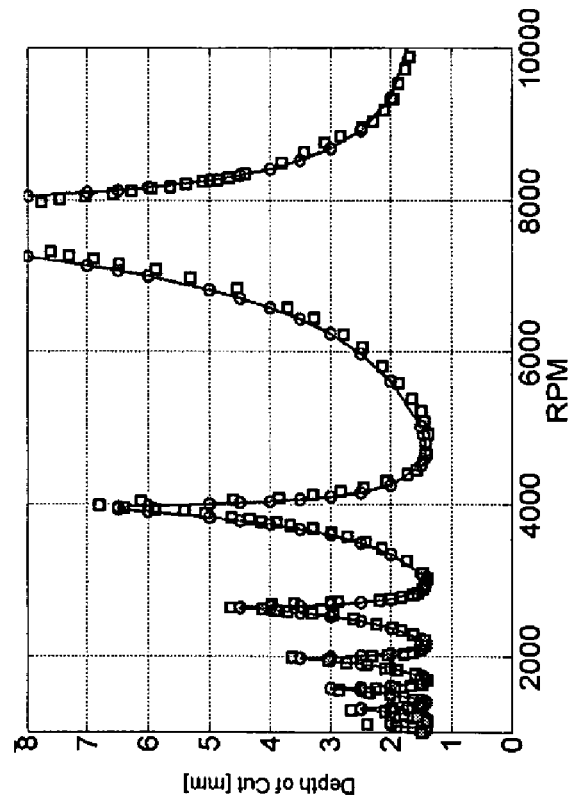
Figure 8a. Comparison of CTCR (circle) and [33, Fig 2] (square) for pitch ratio = 1.

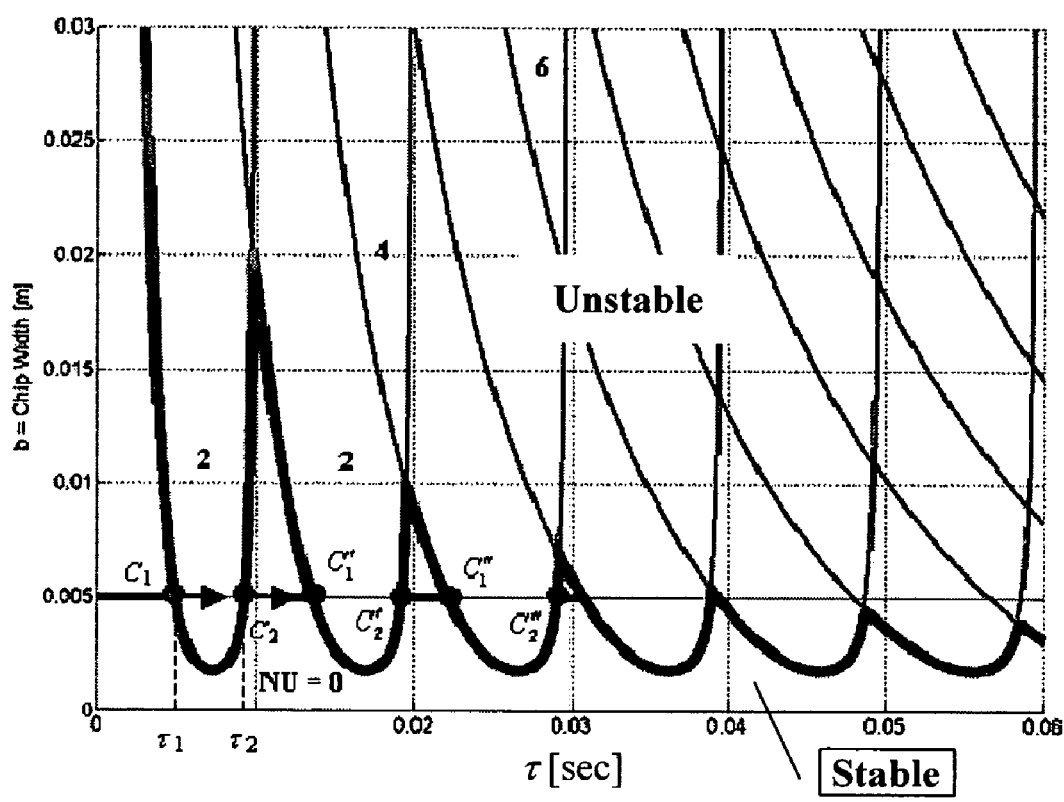
FIGURE 9. Chatter stability chart in delay domain

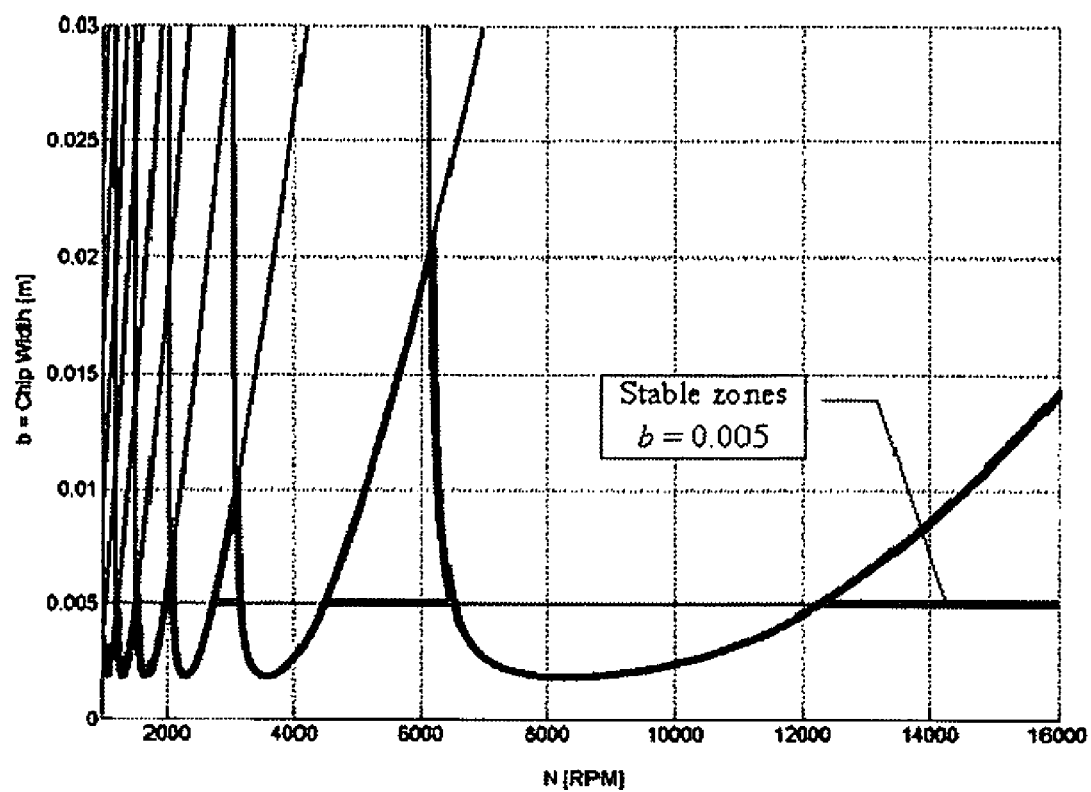
FIGURE 10. Chatter stability lobes

METHOD FOR FACILITATING CHATTER STABILITY MAPPING IN A SIMULTANEOUS MACHINING APPLICATION

CROSS-REFERENCE TO RELATED APPLICATIONS

The present application claims the benefit of a co-pending provisional patent application entitled "System and Method for Chatter Stability Prediction and Control in Simultaneous Machining Applications," which was filed on May 26, 2005 and assigned Ser. No. 60/684,915. The entire contents of the foregoing provisional patent application are incorporated herein by reference.

TECHNICAL FIELD

The present disclosure is directed to an advantageous system and method for optimization of machining applications with multiple cutters on a single workpiece. More particularly, the present disclosure is directed to systems/methods for reducing and/or controlling machine tool chatter in simultaneous machining applications, thereby permitting efficient and/or optimized machining utilities and applications.

BACKGROUND ART

The present application relates to the stability of simultaneous (or parallel) machining, where multiple tools operate at different spindle speeds on the same work-piece. For instance and as used herein, the term "simultaneous machining" (SM) encompasses multiple conventional milling spindles, single milling cutters with non-uniformly distributed cutter flutes, and other machining applications that are characterized, at least in part, by non-uniform pitch cutters, including single spindle machining applications that are characterized by such non-uniformity. Simultaneous machining operations (as defined above), as opposed to conventional single tool machining (STM) (also known as serial process), are generally more time efficient. It is also known that the dynamics of SM applications are considerably more complex. When metal removal rates are maximized, the dynamic coupling among the cutting tools, the work-piece and the machine tool(s) become very critical and regenerative forces are generally more pronounced. The dynamic stability repercussions of such settings are poorly understood at present, even in the mathematics community. In fact, there is no analytical mechanism available to assess such regenerative forces in SM applications and no evidence in the literature addressing the stability of simultaneous machining.

It is well known from numerous investigations that conventional single tool machining (STM) introduces significant stability issues, e.g., when STM operations are optimized. Stability issues are even more pronounced in more complex SM applications and systems. In the absence of a solid mathematical methodology to study and/or address SM chatter, the existing industrial practice is sub-optimal and is generally guided by trial-and-error or ad hoc procedures. Accordingly, there is room for much-needed improvement in the machining field.

Optimum machining aims to maximize the material removal rate, while maintaining a sufficient stability margin to assure the surface quality. Machine tool instability associated with machining applications primarily relates to 'chatter'. As accepted in the manufacturing community, there are two groups or types of machine tool chatter: regenerative and non-regenerative. See, e.g., J. Tlusty, *Machine Dynamics, Handbook of High Speed Machining Technology*: Chapman and Hall, NY, 1985. Regenerative chatter occurs due to the periodic tool passing over the undulations on the previously cut surface, and non-regenerative chatter is associated with mode coupling among the existing modal oscillations. The methods and systems of the present disclosure are primarily aimed at mapping and/or control of regenerative chatter and, for purposes of the detailed description which follows, the term "chatter" refers to "regenerative chatter" unless otherwise noted.

Generally, in order to prevent the onset of chatter, a manufacturer/system operator must select appropriate operational parameters, e.g., chip loads and spindle speeds. Existing studies on machine tool stability address conventional single-tool machining processes. They are inapplicable, however, to SM because of the substantial differences in the underlying mathematics. Indeed, simultaneous machining gives rise to a complex mathematical characterization known as "parametric quasi-polynomials with multiple delay terms". There is no practical methodology known at this point, to resolve the complete stability mapping for such constructs.

Machine tool chatter is an undesired engineering phenomenon. Its negative effects on the surface quality, tool life and other operational parameters/results are well known. Starting with early reported works[7-10], many researchers meticulously addressed the issues of modeling, dynamic progression, structural reasoning and stability limit aspects of this seemingly straightforward and very common behavior. See, M. E. Merchant, "Basic Mechanics of the Metal-Cutting Process," *ASME Journal of Applied Mechanics*, vol. 66, pp. A-168, 1944; S. Doi and S. Kato, "Chatter Vibration of Lathe Tools," *Transactions of ASME*, vol. 78, pp. 1127, 1956; S. A. Tobias, *Machine Tool Vibration*: Wiley, NY, 1961; and J. Tlusty, L. Spacek, M. Polacek, and O. Danek, *Selbsterregte Schwingungen an Werkzeugmaschinen*: VEB Verlag Technik, Berlin, 1962. Further research focused on the particulars of parameter selections in machining to avoid the build-up of these undesired oscillations and on the analytical predictions of chatter. See, J. Tlusty, *Machine Dynamics, Handbook of High Speed Machining Technology*: Chapman and Hall, NY, 1985; J. Tlusty, L. Spacek, M. Polacek, and O. Danek, *Selbsterregte Schwingungen an Werkzeugmnaschinen*: VEB Verlag Technik, Berlin, 1962; H. E. Merritt, "Theory of Self Excited Machine Tool Chatter," *Journal of Engineering for Industry*, pp. 447, 1965; and R. L. Kegg, "Cutting Dynamics in Machine Tool Chatter," *Journal of Engineering for Industry*, pp. 464, 1965. Most commonly, chatter research has focused on the conventional single tool machining (STM).

Generally, the principle aim of machining applications is to increase the metal removal rate while avoiding the onset of chatter. See, e.g., Y. Altintas and E. Budak, "Analytical Prediction of Stability Lobes in Milling," *Annals of the CIRP*, vol. 44, 1995; S. Smith and J. Tlusty, "Efficient Simulation Program for Chatter in Milling," *Annals of the CIRP*, vol. 42, 1993; and S. Smith and J. Tlusty, "Update on High Speed Milling Dynamics," *Tran. ASME, J. Of Engineering for Industry*, 1990. A natural progressive trend is to increase the productivity through simultaneous (or parallel) machining. Ideally, this process can be further optimized by determining the best combination of chip loads and spindle speeds with the constraint of chatter instability. For SM, however, multiple spindle speeds, which cross-influence each other, create governing differential equations with multiple time delay terms. Their characteristic equations are known in mathematics as "quasi polynomials with multiple time delays". Multiplicity of the delays present enormously more complicated problems compared with the conventional single-tool machining (STM) chatter and have heretofore prevented the mapping and/or control of SM applications for optimization purposes.

For background purposes, the basics of STM chatter dynamics are reviewed herein. In this regard, reference is specifically made to the text "Machine Dynamics, Handbook of High Speed Machining Technology," J. Tlusty, Chapman and Hall, NY, 1985. For illustrative purposes, reference is made to FIG. 1 which relates to an exemplary orthogonal turning process. The underlying mechanism for regenerative chatter is quite simple to state. The desired (and nominal) chip thickness, $h_o$, is considered constant. The tool actually cuts the chip from the surface, which is created during the previous pass. The process-generated cutting force, F, is realistically assumed to be proportional to the dynamic chip thickness, h(t). Such force carries the signature of $y(t)-y(t-\tau)$, where y(t) is the fluctuating part of the chip thickness at time t (so called "offset chip thickness" from the nominal value $h_0$), and $\tau$ (sec) is the period of successive passages of the tool, which is equal to 60/N, where N is the spindle speed (RPM).

The block diagram in FIG. 2 gives a classical causality representation of the dynamics for this orthogonal turning operation. Nominal chip thickness, $h_o$, is disturbed by the undulating offset chip thickness, y. These undulations create driving forces for the y dynamics $\tau$ sec later during the next passage and thus the attribute "regenerative" chatter. G(s) is the transfer function between the cutting force, F, and y. For the sake of streamlining the analysis, a single-degree-of-freedom cutting dynamics is taken into account instead of higher-degree-of-freedom and more complex models. The workpiece and its rotational axis are considered to be rigidly fixed and the only tool flexibility is taken in the radial direction. In FIG. 2 the following causal relations are incorporated

| Cutting force | $F(t) = Cbh(t)$ | (1) |
| Actual chip thickness | $h(t) = h_o - y(t) + y(t - \tau)$ | (2) | where b is the chip width which is user selected and assumed constant, C is the cutting force constant, $\tau$ [sec] is the period of one spindle revolution, $\tau$=60/N, N [RPM].

Assuming that the force-displacement transfer function G(s) is linear, the entire cutting mechanism described by FIG. 1 is linear. Cutting would be at equilibrium if y=0, which means an ideal cut with no waviness. The cutting force, F, remains constant and the tool support structure (i.e., k, c) yields a static deflection throughout the cutting. This equilibrium is called "stable" or "asymptotically stable" if the loop characteristic equation of the block in FIG. 2 [Eq. 3] has all its roots on the stable left half plane.

$$1+(1-e^{-\tau s})bCG(s)=0 \quad (3)$$

This equation is transcendental and it possesses infinitely many finite characteristic roots, all of which have to be taken into account for stability. Although the problem looks prohibitively complex, the complete stability map is obtainable for single delay cases (i.e., STM). It is clear that the selection of b and $\tau$ influences the stability of the system considerably. The complete stability map of this system in b and $\tau$ domain are the well known "chatter stability lobes" as shown in FIG. 3 (using the parameters from N. Olgac and M. Hosek, "A New Perspective and Analysis for Regenerative Machine Tool Chatter," *International Journal of Machine Tools & Manufacture*, vol. 38, pp. 783-798, 1998). There are several such lobes marked on FIG. 3 which represent the (b, $\tau$) plane mapping of the dynamics with dominant characteristic root at Re(s)=−a. When a=0 (the thick line), these curves show the well known stability lobes which form the stability constraints for any process optimization. For instance, if the removal rate is increased (e.g., by increasing the chip width, b), chatter instability is ultimately encountered which is obviously undesirable and unacceptable.

There are generally two cutting conditions under the control of the machinist: $\tau$, which is the inverse of the spindle speed (60/N), and b, the chip width. The other parameters, i.e., C, G(s), represent the existing cutting characteristics, which are considered to remain unchanged. The open loop transfer function G(s) typically manifests high-impedance, damped, and stable dynamic behavior.

Certain selections of b and $\tau$(=60/N) can introduce marginal stability to the system, as shown in FIG. 3. At these operating points, the characteristic equation (3) possesses a pair of imaginary roots, i as dominant roots. As such, the complete system is resonant at. That is, the entire structure mimics a spring-mass resonator (i.e., a conservative system) at the respective frequency of marginal stability (also known as "chatter frequency"). The desirable operating point should lie in the shaded region, marked as "stable" in FIG. 3.

For appropriate operational margins, it is desirable to select the cutting parameters (b, N) sufficiently away from the chatter stability bounds. Conventional terminology alluding to this feature is called the "stability margin", which refers to the a=−Re (dominant characteristic root). The bigger the value of a, the higher the "chatter rejection speed", therefore, the better the surface quality. A set of operating points are shown in FIG. 3, where a=5, 10 and 15, illustrating the distribution of the loci where the chatter rejection speed is constant. Optimum working conditions are reached by increasing b and N up to the physical limitations, provided that a desirable stability margin (i.e., a) is guaranteed. FIG. 3 also represents a unique declaration in the machine tool literature as "equal stability margin" lobes.

Regenerative Chatter in Simultaneous Machining

The functional block diagram in FIG. 2 expands in dimension by the number of tools involved in the case of simultaneous machining, as depicted in FIGS. 4a and 4b for two exemplary operations. The flexures are shown at a single point and in a 1-D sense to symbolize the most complex form of the restoring forces in 3-D. Spindle speeds and their directions are also selected symbolically for purposes of describing/reflecting the types of operations at issue.

A crucial difference between STM and SM operations is the coupling among the individual tool-workpiece interfaces (e.g., coupling among multiple milling spindles and/or coupling among non-uniformly distributed cutter flutes on a single milling cutter), either through the flexible work-piece (as in FIG. 4a) or the machine tool compliance characteristics (as in FIG. 4b), or both. Clearly, the chip load at tool i (i= 1 . . . n) which carries the signature of $y_i(t)-y_i(t-\tau_i)$, will influence the dynamics at tool j. This is a cross-regenerative effect, which implies that the state of the $i^{th}$ tool one revolution earlier (i.e., $\tau_i$ seconds) affects the present dynamics of the $j^{th}$ tool. Consequently, the dynamics of tool j will reflect the combined regenerative effects from all the tools, including itself. Assuming these tool-to-tool interfaces are governed under linear relations, the overall dynamics become a truly cross-coupled linear multiple time-delay system. The cutting force directions are time varying (and periodic) in nature. However, as contemplated in the literature, the fundamental elements of these forces may be addressed in their Fourier expansions. See, e.g., Y. Altintas, S. Engin, and E. Budak, "Analytical Stability Prediction and Design of Variable Pitch Cutters," *ASME Journal of Manufacturing Science and Engi-* neering, vol. 121, pp. 173-178, 1999. As such, the linear-time-invariant nature is maintained in the overall dynamics.

The stability of multiple delay systems is poorly known in the mathematics community. There is no simple extension of the conventional (STM) stability treatment to multiple spindle and/or non-uniformly distributed flutes on a single cutter, and consequently to multiple delay cases. Accordingly, the ability to predict and/or control chatter stability in such SM systems/applications is essentially non-existent.

It is noted that prior art investigations which perform time domain simulations, such as described by Y. Altintas, S. Engin and E. Budak in "Analytical Stability Prediction and Design of Variable Pitch Cutters," *ASME Journal of Manufacturing Science and Engineering*, Vol. 121, pp. 173-78 (1999), are non-analogous operations as compared to the systems and methods of the present disclosure. First, the foregoing investigations are performed point-by-point in ($\tau_1$, $\tau_2$) space and, therefore, the application is computationally overwhelming. Second, the foregoing investigations are of a numerical (as opposed to analytical) nature. Other reported mathematical investigations also declare strict limitations and restrictions to their pursuits. For example, in C. S. Hsu, "Application of the Tau-Decomposition Method to Dynamical Systems Subjected to Retarded Follower Forces," *ASME Journal of Applied Mechanics*, vol. 37, pp. 258-266, 1970, it is claimed that it is very difficult to utilize Pontryagin's Theorem for the stability analysis when n>1 and det((G(s)) invites higher degree terms of 's' than one. In a further publication, the same problem is handled using simultaneous nonlinear equation solvers, but such approach is only able to treat systems with Eq (4) (see below) in a+b $e^{-\tau_1 s}$+c $e^{-\tau_2 s}$=0 construct with a, b, c being constants. See, J. K. Hale and W. Huang, "Global Geometry of the Stable Regions for Two Delay Differential Equations," *Journal of Mathematical Analysis and Applications*, vol. 178, pp. 344-362, 1993. This approach imposes an obvious and very serious restriction for the problem at hand. Further prior art teachings tackle a limited subclass of equation (4) with detG(s) of degree 2, but without a damping term, and the disclosed approach is not expandable to damped cases. See, S.-I. Niculescu, "On Delay Robustness Analysis of a Simple Control Algorithm in High-Speed Networks," *Automatica*, vol. 38, pp. 885-889, 2002; and G. Stepan, *Retarded Dynamical Systems: Stability and Characteristic Function*. New York: Longman Scientific & Technical, co-publisher John Wiley & Sons Inc., US., 1989. The foregoing references also consider the parameter vector (B) as fixed.

Thus, despite efforts to date, a need exists for systems and methods that facilitate chatter stability mapping and/or control in simultaneous machining applications. A further need exists for systems and methods that permit optimized and/or enhanced STM operations at least in part based on chatter stability mapping and/or control. These and other needs and objectives are met by the disclosed systems and methods described herein.

SUMMARY OF THE PRESENT DISCLOSURE

According to the present disclosure, advantageous systems and methods for optimization of SM machining operations and/or applications are disclosed. The SM applications encompassed within the disclosed systems and methods have particular applicability to systems that include multiple spindles and/or one or more single milling cutters with non-uniformly distributed cutter flutes, operating on a single workpiece. Indeed, the systems and methods of the present disclosure are effective in reducing and/or controlling machine tool chatter in simultaneous machining (SM) applications as defined herein, thereby permitting efficient and/or optimized machining utilities and applications.

The disclosed systems and methods for chatter stability mapping and/or control in simultaneous machining applications utilize the cluster treatment of characteristic roots (CTCR) paradigm. More particularly, the disclosed chatter stability mapping and/or control systems and methods for simultaneous machining applications disclosed herein generally include the following steps:

i) Among the infinitely many characteristic roots generated by an arbitrary time delay set $\{\tau\}=(\tau_1,\tau_2)$ typically there is not an imaginary pair. The CTCR routine of the present disclosure requires/undertakes an exhaustive detection of all those $\{\tau\}$ sets, which yield imaginary characteristic roots, say $\omega_c i$. This is the first "clustering" operation with the respective earmarking of $\omega_c$'s. Of particular significance for chatter stability mapping and/or control, system stability can possibly change only at those $\{\tau\}$ sets marked by the clustering identifier, s=$\omega_c i$. This clustering refers to a hyperplane in $\{\tau\}$ which displays a continuum of s=$\omega_c i$ root crossings. It is generally necessary to determine the complete kernel $\wp_0(\tau_1,\tau_2)$ to achieve advantageous chatter stability mapping and/or control. The complete kernel is analytically and numerically manageable in size. This $\wp_0(\tau_1,\tau_2)$ is the generator of the infinitely many and complete set of crossing curves $\wp(\tau_1,\tau_2)$ according to equation (13), as set forth below.

ii) A second "clustering" is generally done within the kernel, $\wp_0(\tau_1,\tau_2)$, utilizing the concept of invariant RT (root tendency). Certain segments of the kernel $\wp_0(\tau_1, \tau_2)$ exhibit certain RT's along $\tau_1$ and $\tau_2$ axes. These tendencies will set the stability switching regime for the offspring curves, $\wp(\tau_1, \tau_2)$.

The foregoing steps generate a complete stability mapping in ($\tau_1$, $\tau_2$) space. Systems and methods for chatter stability prediction and/or control according to the present disclosure are adapted to perform the foregoing processing steps, e.g., through implementation of appropriate software code on one or more processing units, as are known in the art. The stability mapping generated through implementation of the disclosed systems and methods may be advantageously employed to control (directly or indirectly) operation of a machining application to avoid (or reduce/minimize) chatter frequencies for a given set of operating parameters. Indeed, in exemplary embodiments of the present disclosure, a machining application is automatically controlled to avoid the chatter frequencies through control means that respond to the determination of chatter frequencies for a given set of operating parameters.

Additional features, functions and advantages associated with the disclosed systems and methods will be apparent from the description which follows, particularly when read in conjunction with the appended figures.

BRIEF DESCRIPTION OF THE FIGURES

To assist those of ordinary skill in the art in making and using the disclosed systems and methods, reference is made to the accompanying figures, wherein:

FIG. 1 is a schematic illustration of a conventional orthogonal turning process;

FIG. 2 is a functional block diagram of chatter regeneration;

FIG. 3 is a plot of typical stability lobes and constant stability margin lobes;

FIGS. 8a and 8b are comparisons of cross-sections according to an implementation of the disclosed systems and methods, superposed on results from a prior art disclosure to Altintas et al.

FIG. 9 is a plot of an exemplary chatter stability chart in delay domain; and

FIG. 10 is a plot of exemplary chatter stability lobes.

DESCRIPTION OF EXEMPLARY EMBODIMENTS

For purposes of the detailed description which follows, the following notational convention shall be employed: bold capital fonts represent the vector or matrix forms of the lower case elements, such as $\{\tau\} = (\tau_1, \tau_2)$ 1. Mathematical Background for Disclosed Systems and Methods For purposes of the present disclosure, the multi-spindle cutting tool dynamics are presented in a generic form (see FIG. 5). Analogous to FIG. 2, $H_0(n \times 1)$ and $H$ $(n \times 1)$ represent the commanded and actual depth-of-cut (d-o-c) vectors, components of which denote the d-o-c at n individual tools. $Y(n \times 1)$ is the tool displacement fluctuations vector along the d-o-c directions. Similarly $BC_{diag} = \text{diag}(b_i C_i)$, $i=1 \ldots n$ represents the influence of $b_i$ (chip width) and $C_i$ (the cutting force constants) vis-à-vis the tool "i". $BC_{diag} = \text{diag }(b_1 C_1, b_2 C_2, \ldots, b_n C_n)$ are the same terms as in the single tool case, except the multiple tool version of such expression. The exponential diagonal matrix $e_{diag}^{-\tau s} = \text{diag}(e^{-\tau_1 s}, e^{-\tau_2 s}, \ldots, e^{-\tau_n s})$, $\tau_i$ $(=60/N_i)$, $i=1 \ldots n$, represents the delay effects (i.e., the regenerative elements). $N_i$'s are the spindle speeds.

The relation between $\tau_j$ and $N_j$ should go through the number of flutes in case of milling. Mathematically, however, this nuance introduces only a scale factor along the delays (when they are uniformly spaced). As such, it may be overlooked at this stage, and this point is revisited below in connection with non-uniformly spaced cutters. G(s) (n×n) is the dynamic influence transfer function which entails all the auto- and cross-coupling effects between the cutting force vector, $F(n \times 1)$, and the tool displacements in the d-o-c direction, $Y(n \times 1)$. It is assumed that these relations are all linear (as is commonly assumed in most fundamental chatter studies). It is clear that G(s) may appear in much more complicated form. For instance, in milling G(s) becomes periodically time-variant matrix. See Y. Altintas, S. Engin, and E. Budak, "Analytical Stability Prediction and Design of Variable Pitch Cutters," *ASME Journal of Manufacturing Science and Engineering*, vol. 121, pp. 173-178, 1999. The past investigations suggest the use of Fourier expansion's fundamental term in such cases to avoid the mathematical complexity while extracting the underlying regenerative characteristics.

Figure 4A:
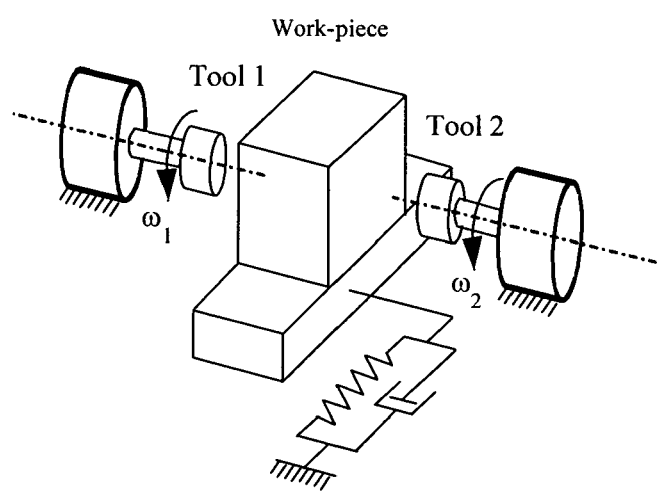
FIG. 4a is a conceptual depiction of simultaneous face milling with a workpiece coupled.
Figure 4B:
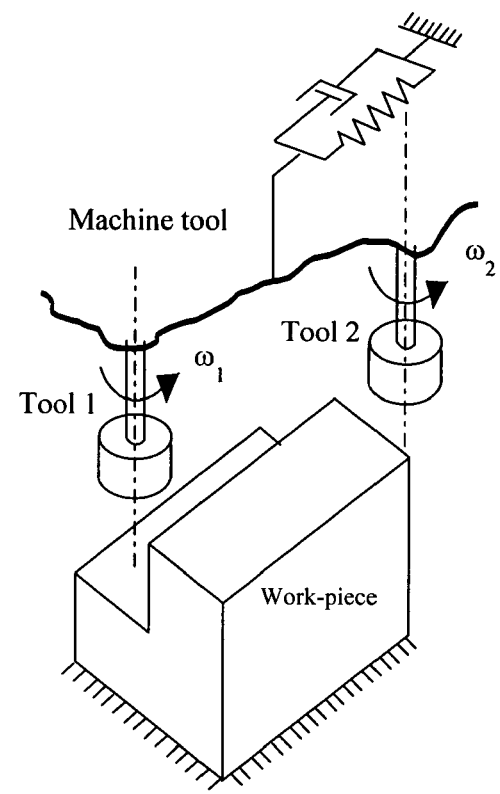
FIG. 4b is a conceptual depiction of simultaneous face milling with a machine tool coupled.
Figure 5:
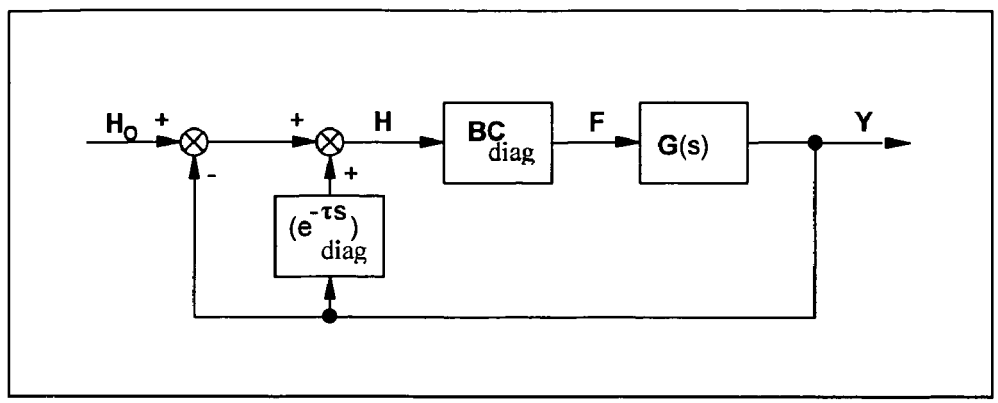
FIG. 5 is a block diagram representing simultaneous machining.

The characteristic equation of the loop in FIG. 5 is:

$$CE(s,\tau,B) = \det[I + G(s) B C_{diag}(I - e_{diag}^{-\tau s})] = 0 \quad (4)$$

which is representative of a dynamics with multiple time delays (τ) and multiple parameters (B), as opposed to a single tool machining, where there is a single delay 'τ' and a single parameter, 'b'. Equation (4) is a "parameterized quasi-polynomial in s with multiple time delays". For a stable operation, its infinitely many characteristic roots should all be on the left half of the complex plane. The most general form of CE(s,τ,B) contains terms like $$e^{-\sum_{j=1}^{n} a_j \tau_j s}$$

with $a_j = 0$ or 1, which represent the cross-talk among the delay terms (i.e., among the tools). For instance, the $e^{-(\tau_1 + \tau_3)s}$ term would indicate the cross-coupling between the regenerative effects of spindles 1 and 3.

For the exceptional case where G(s) is also diagonal, equation (4) decouples all the delay effects so that the problem reduces to n independent STM chatter problems. Otherwise the cross-talk terms will appear in equation (4), which adds to the complexity of the analysis considerably. A critical point to note is that there is no possible commensurate delay formation here, i.e., no terms will appear with $e^{-k\tau_1 s}$, $k \geq 2$. Physically, this implies that the regenerative effect of tool j acts on itself only once.

Substantial literature is available on the stability of systems with only one single time delay, even for commensurate cases. See, e.g., C. S. Hsu, "Application of the Tau-Decomposition Method to Dynamical Systems Subjected to Retarded Follower Forces," *ASME Journal of Applied Mechanics*, vol. 37, pp. 258-266, 1970; C. S. Hsu and K. L. Bhatt, "Stability Charts for Second-Order Dynamical Systems with Time Lag," *ASME Journal of Applied Mechanics*, vol. 33, pp. 119-124, 1966; J. Chen, G. Gu, and C. N. Nett, "A new method for computing delay margins for stability of linear delay systems," *Systems & Control Letters*, vol. 26, pp. 107-117, 1995; K. L. Cooke and P. van den Driessche, "On Zeros of Some Transcendental Equations," *Funkcialaj Ekvacioj*, vol. 29, pp. 77-90, 1986; and Z. V. Rekasius, "A Stability Test for Systems with Delays," presented at Proc. Joint Automatic Control Conf., Paper No. TP9-A, 1980. Single-tool machining chatter dynamics is a simple subclass of such systems. The published studies address the question of the "stability margin" in time delay, $\tau_{max}$. Such studies consider all the parameters (B) to be fixed and claim/assume that higher delay values than a certain $\tau_{max}$ would invite instability. The prior art teachings typically stop with the foregoing claim/assumption.

In recent work involving the inventor of the present application, approaches and/or paradigms that enable the determination of all the stable regions of τ completely (including the first stability interval of $0 < \tau < \tau_{max}$) are provided. See, R. Sipahi and N. Olgac, "A New Perspective for Time Delayed Control Systems with Application to Vibration Suppression," presented at ASME-IMECE, No. DSC 33535, Best Student Paper Award, New Orleans, L.A., 2002; R. Sipahi and N. Olgac, "Degenerate Cases in Using Direct Method," *Transaction of ASME, Journal of Dynamic Systems, Measurement, and Control*, vol. 125, pp. 194-201, 2003; R. Sipahi and N. Olgac, "Active Vibration Suppression with Time Delayed Feedback," *ASME J. of Vibration and Acoustics*, vol. 125, pp. 384-388, 2003; N. Olgac and R. Sipahi, "An exact method for the stability analysis of time delayed LTI systems," *IEEE*

*Transactions on Automatic Control*, vol. 47, pp. 793-797, 2002; and N. Olgac and R. Sipahi, "A Practical Method For Analyzing the Stability of Neutral Type LTI-Time Delayed Systems," *Automatica*, vol. 40, pp. 847-853, 2004. The foregoing publications are incorporated herein by reference. This new framework, called "Cluster Treatment of Characteristic Roots (CTCR)", yields a complete stability picture for single delay systems. Multiple time delay systems (MTDS) are, however, significantly more complex and their parameterized form (i.e., for varying B matrix) increase the difficulty by another order of magnitude.

With further reference to the system depicted in FIG. 5, systems and methods of the present disclosure are asymptotically stable if and only if all the roots of the transcendental characteristic equation (4) are on the left half of the complex 's' plane. Infinitely many such roots will have to be tracked for the desired stability assessment, which is obviously a prohibitively difficult task. Prior to the teachings of the present disclosure, there exists no methodology for use in studying and/or controlling the stability of such systems.

Contrary to the efforts reported in the technical literature, the systems and methods of the present disclosure advantageously employ the most general form of equation (4) under the conceptual framework of the Cluster Treatment of Characteristic Roots (CTCR). The disclosed implementations permit advantageous chatter stability prediction and/or control in simultaneous machining applications, as defined herein.

The CTCR Methodology

In order to avoid notational complexity, the description of the Cluster Treatment of Characteristic Roots (CTCR) methodology presented herein uses a reduced system for n=2, without loss of generality. The most general form of the characteristic equation (4) for n=2 becomes:

$$CE(s,\tau_1,\tau_2,b_1,b_2) = a_0 + a_1 e^{-\tau_1 s} + a_2 e^{-\tau_2 s} + a_3 e^{-(\tau_1+\tau_2)s} = 0 \quad (5)$$

where $a_j$ (s, $b_1$, $b_2$), j=0, 1, 2, 3 are polynomials in "s" with parameterized coefficients in $b_1$ and $b_2$. The highest degree of "s" in equation (5) resides within $a_0$(s) and it has no time delay accompanying it. This characteristic equation represents the behavior of a dual-tool SM (n=2) cutting on a workpiece simultaneously. It is desired according to the present disclosure to recover the stability portrait (referred to as the 'lobes') in four-dimensional ($\tau_1$, $\tau_2$, $b_1$, $b_2$) space. The delay terms $\tau_i$(=60/$N_i$)'s are independent from each other. In short, the dynamics at hand is a Retarded Multiple Time Delay System, as known in the mathematics field.

The intended stability map over the 4-dimensional parametric space of ($\tau_1$, $\tau_2$, $b_1$, $b_2$) is, in fact, analogous to the conventional stability lobes for a single $\tau$ and single b in the space of dual $\tau$'s and dual b's instead. The transition, however, from single to multiple time delays is not trivial, even when the parameters ($b_1$, $b_2$) are fixed. The description which follows provides an advantageous mathematical tool for this operation. As will be readily appreciated by persons skilled in the art, the disclosed mathematical tool may be embodied in appropriate software code/algorithms for operation on a processing unit that is in communication with appropriate ancillary components and/or functionalities, e.g., memory storage, data input (e.g., keyboard), network interface(s), and the like.

Initially, the present description focuses on the simpler stability problem when B=$(b_1, b_2)^T$ parameters are fixed. It is believed that there is no available methodology even for this simplified problem. Although the dynamics represented by equation (5) possess infinitely many characteristic roots, the most critical ones are those that are purely imaginary. Any stability switching (from stable to unstable or vice-versa) takes place when the parameters cause such purely imaginary roots. These imaginary roots display some very interesting constructs. Indeed, it has been found according to the present disclosure that transitioning of CTCR from single-delay to multiple-delays leads to an advantageous exhaustive stability analysis tool in the space of the time delays ($\tau_1$, $\tau_2$).

The equation (5) can have an imaginary root only along countably infinite number of hyperplanes $\wp(\tau_1, \tau_2); \tau_1$ and $\tau_2 \in \Re^+$. These hyperplanes (which are simply 'curves' in 2-D) are indeed offspring of a manageably small number of hyperplanes, which are referred to as 'kernel hyperplanes', $\wp_0(\tau_1, \tau_2)$. All of the hyperplanes in $\wp(\tau_1, \tau_2)$ are descendants of $\wp_0(\tau_1, \tau_2)$. Related to this initial exemplary application, the following points are presented which further illustrate and exemplify the CTCR framework:

1. Kernel and offspring: If there is an imaginary root at s=$\mp\omega_c$i (subscript 'c' is for crossing) for a given set of time delays $\{\tau_0\}=(\tau_{10}, \tau_{20})$, the same imaginary root will appear at all the countably infinite grid points of $$\{\tau\} = \left(\tau_{10} + \frac{2\pi}{\omega_c}j, \tau_{20} + \frac{2\pi}{\omega_c}k\right), \quad j = 1, 2, \ldots, k = 1, 2, \ldots \quad (6)$$

For a fixed $\omega_c$, the distinct points of equation (6) generate a grid in $\{\tau\}\in\Re^{2+}$ space with equidistant grid size in both dimensions. When $\omega_c$ is varied continuously, the respective grid points also display a continuous variation, which ultimately forms the hyperplanes $\wp(\tau_1, \tau_2)$. Therefore, instead of generating these grid points and studying their variational properties, the systems and methods according to the present disclosure search only for the critical building block, 'the kernel', for j=k=0 and for all possible $\omega_c$'s, $\omega_c \in \Re^+$. It is alternatively defined by min($\tau_1$, $\tau_2$)$_{\omega_c}$, ($\tau_1$, $\tau_2$)$\in \Re^{2+}$ for all possible $\omega_c$'s.

2. Determination of the kernel. As stated above, if there is any stability switching (i.e., from stability to instability or vice versa), it will take place at a point on $\wp(\tau_1, \tau_2)$ curves. Therefore, it is generally necessary to identify all possible $\wp(\tau_1, \tau_2)$, and the representative $\omega_c$'s. In other words, it is generally necessary to determine the kernel $\wp_0(\tau_1, \tau_2)$ along which all the imaginary roots, s=$\omega_c$i, of equation (5) are found. Accordingly, the description of kernel must be exhaustive. Furthermore, any and every point ($\tau_1$, $\tau_2$) causing an s=$\mp\omega_c$i root must be either on $\wp_0(\tau_1, \tau_2)$ or a $\wp(\tau_1, \tau_2)$. The determination of such a kernel and its offspring is a very challenging problem from a mathematical standpoint. To solve this problem, a unique transformation called "the Rekasius substitution" is employed [see, Z. V. Rekasius, "A Stability Test for Systems with Delays," presented at Proc. Joint Automatic Control Conf., Paper No. TP9-A, 1980]:

$$e^{-\tau_i s} = \frac{1 - T_i s}{1 + T_i s}, T_i \in \mathcal{R}, i = 1, 2 \quad (7)$$

which holds identically for s=$\omega_c$i, $\omega_c \in \Re$. This is an exact substitution for the exponential term, not an approximation, for s=$\omega_c$i, with the mapping condition of:

$$\tau_i = \frac{2}{\omega_c}[\tan^{-1}(\omega_c T_i) + j\pi], j = 0, 1, \ldots \quad (8)$$

Equation (8) describes an asymmetric mapping in which $T_i$ (distinct in general) is mapped into countably infinite $\tau_i$ sets, each of which has periodically distributed time delays for a given $\omega_c$ with periodicity $2\pi/\omega_c$. Substitution of equation (8) into equation (5) converts it from CE(s, $\tau_1$, $\tau_2$) to CE'(s, $T_1$, $T_2$). There is a slight breach of notation in the foregoing substitution which drops $b_1$, $b_2$ parameters from the arguments both in CE and CE'. A further equation is created as follows:

$$\overline{CE}(s, T_1, T_2) = CE'(s, T_1, T_2)(1 + T_1 s)(1 + T_2 s) = \sum_{k=0}^{4} b_k(T_1, T_2) s^k \quad (9)$$

Since the transcendental terms have all disappeared, this equation (9) can now be studied much more efficiently. All the imaginary roots of CE(s, $\tau_1$, $\tau_2$) and $\overline{CE}$(s, $T_1$, $T_2$) are identical, i.e., they coincide, while there is no enforced correspondence between the remaining roots of these equations. That is, considering the root topologies:

$$\Omega_1 = \{s | CE(s, \tau_1, \tau_2) = 0, (\tau_1, \tau_2) \in \Re^{2+}\}, \Omega_2 = \{s | \overline{CE}(s, T_1, T_2) = 0, (T_1, T_2) \in \Re^2\} \quad (10)$$

the imaginary elements of these two topologies are identical.

In another notation, one can write $\Omega_1 \cap C^0 \equiv \Omega_2 \cap C^0$, where $C^0$ represents the imaginary axis. It is clear that the exhaustive determination of the $(T_1, T_2) \in \Re$ loci (and the corresponding $\omega_c$'s) from equation (9) is a much easier task than the exhaustive evaluation of the same loci in $(\tau_1, \tau_2) \in \Re^{2+}$ from equation (5). Once these loci in $(T_1, T_2)$ are found, the corresponding kernel and offspring in $(\tau_1, \tau_2)$ can be advantageously determined as per equation (8).

For definitional purposes, the root sensitivities of each purely imaginary characteristic root crossing, $\omega_c i$, with respect to one of the time delays is defined as:

$$S^s_{\tau_j}\Big|_{s=\omega_c i} = \frac{ds}{d\tau_j}\Big|_{s=\omega_c i} = -\frac{\frac{\partial CE}{\partial \tau_j}}{\frac{\partial CE}{\partial s}}\Bigg|_{s=\omega_c i} \quad i = \sqrt{-1}, j = 1, 2 \quad (11)$$

and the corresponding root tendency with respect to one of the delays is given as:

$$\text{Root Tendency} = RT|_{s=\omega_c i}{}^{\tau_j} = \text{sgn}[Re(S^s_{\tau_j}|_{s=\omega_c i})] \quad (12)$$

This property represents the direction of the characteristic root's crossing when only one of the delays varies.

For a crossing frequency, $\omega_c$ caused by the point ($\tau_{10}$, $\tau_{20}$) on the kernel and its 2-D offspring:

$$(\tau_1, \tau_2)_{\omega_c} = \left( \tau_{1j} = \tau_{10} + \frac{2\pi}{\omega_c} j, \tau_{2k} = \tau_{20} + \frac{2\pi}{\omega_c} k; j = 0, 1, 2, \ldots, k = 0, 1, 2, \ldots \right) \quad (13)$$

The root tendency at this point is invariant with respect to j (or k) when k (or j) is fixed. That is, regardless of which offspring ($\tau_{1j}$, $\tau_{2k}$) of the kernel set ($\tau_{10}$, $\tau_{20}$) causes the crossing, $RT|_{s=\omega_c i}{}^{\tau_1}$ ($RT|_{s=\omega_c i}{}^{\tau_2}$) are the same for all j=1, 2 . . . (k=1, 2 . . . ), respectively. Accordingly, the imaginary root always crosses either to the unstable right half plane (RT=+1) or to the stable left half plane (RT=−1), when one of the delays is kept fixed, and the other one is skipping from one grid point to the next, regardless of the actual values of the time delays, as long as they are derived from the same kernel ($\tau_{10}$, $\tau_{20}$).

As noted in the summary section of this disclosure, the disclosed systems and methods for chatter stability mapping and/or control in simultaneous machining applications utilize and are based upon the cluster treatment of characteristic roots (CTCR) paradigm. In exemplary embodiments of the present disclosure, chatter stability mapping and/or control systems and methods for simultaneous machining applications generally include the following steps:

iii) Among the infinitely many characteristic roots generated by an arbitrary time delay set $\{\tau\} = (\tau_1, \tau_2)$ typically there is not an imaginary pair. The CTCR routine of the present disclosure requires/undertakes an exhaustive detection of all those $\{\tau\}$ sets, which yield imaginary characteristic roots, say $\omega_c i$. This is the first "clustering" operation with the respective earmarking of $\omega_c$'s. Of particular significance for chatter stability mapping and/or control, system stability can possibly change only at those $\{\tau\}$ sets marked by the clustering identifier, $s=\omega_c i$. This clustering refers to a hyperplane in $\{\tau\}$ which displays a continuum of $s=\omega_c i$ root crossings. As stated earlier, it is generally necessary to determine the complete kernel $\wp_0(\tau_1, \tau_2)$ to achieve advantageous chatter stability mapping and/or control. The complete kernel is analytically and numerically manageable in size. This $\wp_0(\tau_1, \tau_2)$ is the generator of the infinitely many and complete set of crossing curves $\wp(\tau_1, \tau_2)$ according to equation (13).

iv) A second "clustering" is done within the kernel, $\wp_0(\tau_1, \tau_2)$, utilizing the concept of invariant RT (root tendency). Certain segments of the kernel $\wp_0(\tau_1, \tau_2)$ exhibit certain RT's along $\tau_1$ and $\tau_2$ axes. These tendencies will set the stability switching regime for the offspring curves, $\wp(\tau_1, \tau_2)$.

The foregoing steps generate a complete stability mapping in ($\tau_1$, $\tau_2$) space. Systems and methods for chatter stability prediction and/or control are provided according to the present disclosure, such systems and methods being adapted to perform the foregoing processing steps, e.g., through implementation of appropriate software code on one or more processing units, as are known in the art. The disclosed systems and methods are effective in generating stability mapping that may be advantageously employed to control (directly or indirectly) operation of a machining application to avoid (or reduce/minimize) chatter frequencies for a given set of operating parameters. For example, machining applications may be automatically controlled to avoid the chatter frequencies through control means that respond to the chatter frequencies identified and/or determined through the disclosed processing steps for a given set of operating parameters.

To further exemplify the systems and methods of the present disclosure, two case studies are presented wherein the capabilities of the foregoing systems and methods for chatter stability prediction and/or control in simultaneous machining applications (as defined herein) are described in greater detail. The first illustrative example is an experimental study which corresponds to a system design described by Y. Altintas, S. Engin, and E. Budak in "Analytical Stability Prediction and Design of Variable Pitch Cutters," *ASME Journal of Manufacturing Science and Engineering*, vol. 121, pp. 173-178, 1999. The second illustrative example demonstrates how one can deploy the disclosed systems/methods to address conventional single tool machining chatter. The following case studies are merely exemplary implementations of the disclosed systems and methods, and the present disclosure is not to be limited by or to such exemplary implementations.

Exemplary Case Studies

Case Study I. Experimental Validation of Disclosed Systems and Methods on Variable Pitch Milling Cutters This case study is directed to a machining process that involves milling with variable pitch cutters. An elegant treatment of variable pitch milling is presented in the above-noted publication by Altintas et al. The underlying dynamics and associated parameters are adopted from the reported work, as confirmed in correspondence with the lead author, Prof. Altintas.

Figure 6A:
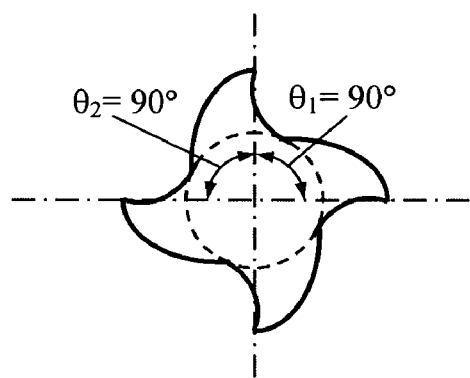
FIG. 6a is a cross-sectional view of an end mill with equidistant flutes.
Figure 6B:
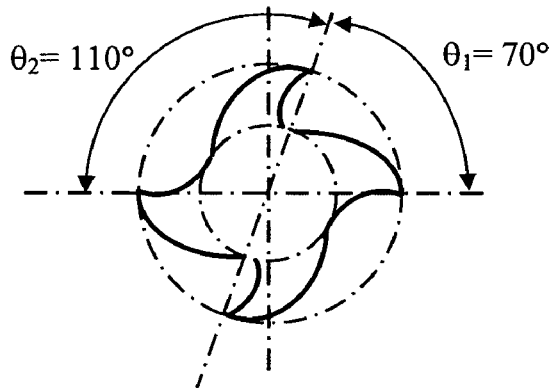
FIG. 6b is a cross-sectional view of an end mill with variable pitch flutes.

The practice of variable pitch cutters originates from the desire for attenuating the regenerative chatter. Instead of four equidistant flutes located around the cutting tool (4×90° as described in FIG. 6a), variable pitch is used ($\theta_1$, $\theta_2$ as shown in FIG. 6b). Many interesting variations of this idea have been developed and put to practice over at least the last forty years. Interesting dynamics emanate from these applications due to the non-uniform pitch distribution. Indeed, multiple regenerative effects appear in the governing equation with multiple time delays. The delays are proportional to the respective pitch angles.

The Altintas et al. publication presents an in-depth study on variable pitch cutters on an end milling process with both numerical and supporting experimental effort. The work converges in very closely matching results with respect to chatter boundaries. In the numerical study thereof, the authors study the system characteristic equation for a given pitch ratio. The core problem with the foregoing approach is defined briefly as follows: A four-fluted uniform-pitch cutter is used first in milling Al356 alloy. The cutter has 19.05 mm diameter, 30° helix and 10° rake angles. The stability chart indicates that this milling process is unstable for axial depth-of-cut a=5 mm and spindle speed N=5000 RPM. A natural question follows: Which pitch angles should be selected for the best chatter stability margins when variable-pitch milling is considered? The prior art provides no guidance for answering this fundamental question.

In this case study according to the present disclosure, the design parameters of the Altintas et al. publication are utilized exactly, except that the pitch ratio is freed, i.e., permitted to vary, thereby introducing a truly multiple time delay construct. In other words, in the present case study, the selection of the two "pitch angles" is left undefined. When the cross-section of the findings generated according to the systems/methods of the present disclosure for a given pitch ratio, the results closely coincide with the results set forth in the referenced Altintas et al. publication. The process steps and the numerical results which yielded the advantageous results described herein are set forth below.

The system characteristic equation is taken as equation (15) from the Altintas et al. publication:

$$\det\left[I - \frac{1}{4\pi}K_t a(4 - 2(e^{-\tau_1 s} + e^{-\tau_2 s}))\Phi_0(s)\right] = 0 \tag{14}$$

with $$K_t = 697\ Mpa,\ a = \text{axial depth-of-cut}\ [m],\ \tau_1[\sec] = \frac{\theta_1[\deg]}{360}\frac{60}{N[RPM]}$$

is the delay occurring due to the pitch angle $$\theta_1,\ \tau_2 = \frac{\theta_2}{\theta_1}\tau_1$$

is the second delay due to $\theta_2$, N is the spindle speed and s is the Laplace variable. The matrix $\Phi_0$ containing the transfer functions and the mean cutting directions is defined as:

$$\Phi_0 = \begin{pmatrix} \phi_{xx}\alpha_{xx} + \phi_{yx}\alpha_{xy} & \phi_{xy}\alpha_{xx} + \phi_{yy}\alpha_{xy} \\ \phi_{xx}\alpha_{yx} + \phi_{yx}\alpha_{yy} & \phi_{xy}\alpha_{yx} + \phi_{yy}\alpha_{yy} \end{pmatrix} \tag{15}$$

where:
$\alpha_x = 0.423$, $\alpha_{xy} = -1.203$
$\alpha_{yx} = 1.937$, $\alpha_{yy} = -1.576$
are the fundamental Fourier components of the periodically varying directional coefficient matrix. The transfer functions in equation (15) are populated from Table 1 in the Altintas et al. publication as:

$$\phi_{xx} = \frac{0.08989}{s^2 + 159.4s + 0.77\ 10^7} +$$

$$\frac{0.6673}{s^2 + 395.2s + 0.1254\ 10^8} + \frac{0.07655}{s^2 + 577.2\ s + 0.2393\ 10^8}$$

$$\phi_{xy} = \phi_{yx} = 0$$

$$\phi_{yy} = \frac{0.834}{s^2 + 162.2\ s + 0.1052\ 10^8}$$

Inclusion of these expressions and parameters in the characteristic equation and expanding the characteristic equation into a scalar expression, the starting point for the advantageous CTCR paradigm is reached according to the present disclosure. For a=4 mm depth-of-cut, the characteristic equation of this dynamics is:

$$\begin{aligned}
CE(s, \tau_1, \tau_2) = &\ \\
& 625\ s^8 + 808750\ s^7 + 35068.83\ 10^6 s^6 + 31376.027\ 10^9 s^5 + \\
& 0.686\ 10^{18} s^4 + 0.385\ 10^{21} s^3 + 0.565\ 10^{25} s^2 + \\
& 0.150\ 10^{28} s + 0.166\ 10^{32} + \\
& (-0.266\ 10^9 s^6 - 0.324\ 10^{12} s^5 - 0.127\ 10^{17} s^4 - 0.924\ 10^{19} s^3 - \\
& 0.18\ 10^{24} s^2 - 0.572\ 10^{26} s - 0.756\ 10^{30})(e^{-\tau_1 s} + e^{-\tau_2 s}) + \\
& (284943.13\ 10^9 s^4 + 0.212\ 10^{18} s^3 + 0.889\ 10^{22} s^2 + \\
& 0.253\ 10^{25} s + 0.538\ 10^{29})e^{-(\tau_1 + \tau_2)s} + \\
& (14247.16\ 10^{10} s^4 + 0.106\ 10^{18} s^3 + 0.445\ 10^{22} s^2 + \\
& 0.126\ 10^{25} s + 0.269\ 10^{29})(e^{-2\tau_1 s} + e^{-2\tau_2 s}) = 0
\end{aligned} \tag{16}$$

The parametric form of equation (16), i.e., the CE (s, $\tau_1$, $\tau_2$, a) expression, is prohibitive to display due to space limitations (thus the substitution of a=4 mm). It is noted that all numerical values above are given in their truncated form to conserve space, as will be readily apparent to persons skilled in the art.

With further reference to equation (16), it is noted that an infinite number of complex roots are defined thereby. For purposes of chatter stability mapping and control of simultaneous machining applications of the present disclosure, if the real part of a complex root is 'positive', then the system is unstable and chatter results. Conversely, if none of the real parts is positive, the system is stable and chatter is avoided.

A critical nuance is noted between equations (4) and (14). The former represents a truly two-spindle, two-cutter setting, while equation (14) is for single spindle with four non-uniformly distributed flutes in a milling cutter. Mathematical expression for the characteristic equation according to the present disclosure becomes two time-delayed quasi polynomial as set forth in equation (16) which is, in fact, more complex than equation (5) due to the commensurate delay formation (i.e., $e^{-2\tau_1 s}$, $e^{-2\tau_2 s}$ terms are present). To assess the stability posture of this equation is a formidable task. No technique in mathematics has been identified that could handle this mission. However, according to the present disclosure, the CTCR paradigm is utilized and the advantageous results are set forth below.

Figure 7A:
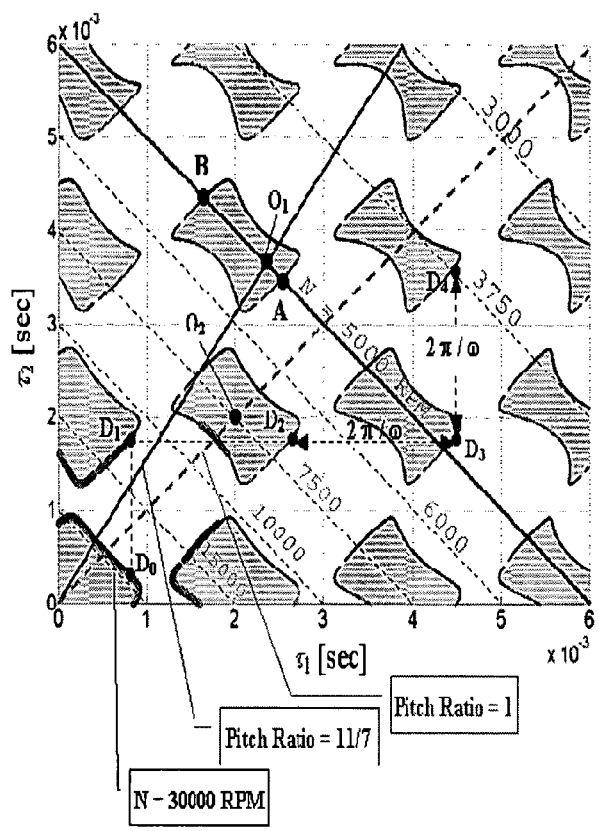
FIG. 7a is a plot showing exemplary stability regions according to the present disclosure for a 4 mm axial depth-of-cut with four-flute cutter milling on Aluminum 356.

The CTCR technique takes over from equation (16) and creates the complete stability outlook in $(\tau_1, \tau_2)$ space as graphically shown in FIG. 7a. The kernel is designated by a thicker/bolder line to discriminate it from its offspring. The grids of $D_0$ (kernel) and $D_1$, $D_2$, $D_3$, ... (offspring sets) are marked for ease of observation. With particular reference to FIG. 7a, the equidistant grid size $2\pi/\omega$ is noted, as per equation (6), $\overline{D_0D_1}=\overline{D_1D_2}=\overline{D_2D_3}=\overline{D_3D_4}$, etc. The $(\tau_1,\tau_2)$ delays at all of these sibling points impart the same $\omega i$ imaginary root for equation (16). Although FIG. 7a is generated for a 4 mm axial depth-of-cut, it is to be understood that the systems/methods of the present disclosure permit generation of additional views at alternative depths-of-cut and, indeed, support the generation of animated/graphical displays reflecting such variable depths.

Figure 7B:
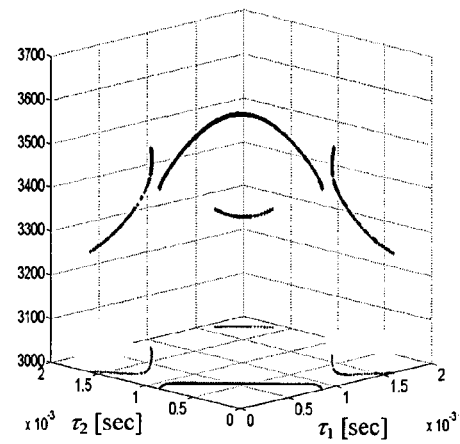
FIG. 7b is a plot showing chatter frequencies (exhaustive) [radis] vs. the kernel $(\tau_1, \tau_2)$.

FIG. 7b is a three-dimensional plot that shows the possible chatter frequencies of this system for all $(\tau_1,\tau_2)\in\Re^+$ for varying pitch ratios $(0,\infty)$, whether they are operationally feasible or not. As described herein, the disclosed system/method can exhibit only a restricted set of imaginary roots (from FIG. 7b, 3250 rad/sec (517 Hz)$<\omega<$3616 rad/sec (575 Hz))—which are invariant from offspring to offspring. However, the foregoing imaginary roots (and associated chatter parameters) will vary across different depths-of-cut. All of these chatter frequencies are created by the kernel and no $(\tau_1,\tau_2)$ point on the offspring can cause an additional chatter frequency outside the given set.

FIG. 7a displays the stable (shaded) and unstable regions in $(\tau_1,\tau_2)$ space for a given axial depth-of-cut (a=4 mm) at a pitch ratio of 11/7. All four kernels are required to generate the bounded regions of FIG. 7a. In addition, each point $(\tau_1,\tau_2)$ in FIG. 7a represents a spindle speed. In view of the relation $$\tau_1+\tau_2=\frac{30}{N},$$

all the constant spindle speed lines are with slope −1, as annotated on the figure. The constant pitch ratio lines pass through the origin (pitch ratio=$\tau_2/\tau_1$).

As demonstrated in this case study, the most desirable pitch ratios are close to $\tau_1/\tau_2=1$ for effective chip removal purposes. Therefore, very high or very low pitch ratios are not desirable (cf., 55°$<\theta_1<$90° as set forth in the Altintas et al. publication). The pitch ratios between $\tau_2/\tau_1\in[1.374, 2.618]$ offer stable operation (marked as points A and B on FIG. 7a) for 5000 RPM, which correspond to pitch angles ($\theta_{1A}$=75.8°, $\theta_{2A}$=104.2°) and ($\theta_{1B}$=49.8°, $\theta_{2B}$=130.2°). These results coincide precisely with the results declared in FIG. 3 of the Altintas et al. publication.

FIG. 7a provides a very powerful tool in the hands of a manufacturing engineer, who can select uniform pitch cutter and 7500 RPM speed (point $O_2$) as opposed to variable pitch cutter (pitch ratio 11/7) and 5000 RPM (point $O_1$), thereby increasing the metal removal rate by 50%. Tool wear may be worsened, however, due to the increased speed. Nevertheless, design/operational choices are beneficial to machining operations, as will be readily apparent to persons skilled in the art.

FIG. 7a is for a constant depth-of-cut. A three-dimensional stability plot can be produced scanning the values of a in (a= 1 . . . 0.6 mm, $\tau_1\in\Re^+$, $\tau_2\in\Re^+$) domain. A cross-section of this 3-D plot with N=constant planes is comparable to FIG. 3 in the Altintas et al. publication. The matching is perfect, as illustrated for the two points, A and B, as stated above.

Chatter stability for two different settings is now studied: (a) uniform pitch cutters ($\theta_1=\theta_2=90°$), and (b) variable pitch cutters ($\theta_1=70°$, $\theta_2=110°$), both with Al356 work-pieces (which were also investigated numerically and experimentally in the Altintas et al. publication; see FIG. 2). The CTCR results are obtained by a single cross section of the stability picture in FIG. 7a along $\tau_2/\tau_1=1$ and $\tau_2/\tau_1=11/7$ lines, respectively, while the entire figure is refreshed for a=1 . . . 6 mm. The results of the cross sections are given in FIG. 8a and FIG. 8b, respectively, superposed on the results of the Altintas et al. publication. The correspondence further validates the systems and methods of the present disclosure for chatter stability mapping and/or control of simultaneous machining applications.

These comparisons further support the conclusion that the disclosed system/method, which utilizes a CTCR methodology, is a powerful tool to predict chatter in multiple time delay dynamics.

Case Study II. Application of CTCR Methodology to Single Tool Machining (STM)

For the conventional chatter stability study (with a single cutter, n=1), a regenerative dynamics with one single time delay appears. The characteristic equation (5) reduces to:

$$CE(s,\tau,b)=a_0(b,s)+a_1(b,s)e^{-\tau s}=0 \qquad (17)$$

where the only delay is $\tau[sec]$=60/N[RPM], N is the spindle speed and b is the width-of-cut. There are numerous case studies in the literature on this problem. For demonstration purposes, orthogonal turning given in Equation 7 of a publication by Olgac et al. is studied [see, N. Olgac and M. Hosek, "A New Perspective and Analysis for Regenerative Machine Tool Chatter," *International Journal of Machine Tools & Manufacture*, vol. 38, pp. 783-798, 1998], which starts from the characteristic equation:

$$1+bC\frac{\cos\beta(1-e^{-\tau s})}{ms^2+cs+k}=0 \qquad (18)$$

where b is the chip width, C, β, m, c and k are the constants related to the cutting dynamics. This equation can also be written as:

$$CE(s,\tau,b)=ms^2+cs+k+bC\cos\beta(1-e^{-\tau s})=0 \qquad (19)$$

which is in the same form as equation (17). The parametric values are taken as:

C=2×10$^9$ N/m$^2$ β=70°
m=50 kg c=2×10$^3$ kg/s k=2×10$^7$ N/m

Equation (19) with these numerical values takes the form of:

$$s^2+40s+400000+13680805.73b-13680805.73be^{-\tau s}=0 \qquad (20)$$

which is comparable to equation (17). The stability pockets in $\tau\in\Re^+$ space for varying chip widths b$\in\wp^+$ are investigated. This picture is conventionally known as the "stability lobes" for regenerative chatter. Unlike multiple delay cases, the problem with a single delay is solvable using a number of different procedures given in the literature. See, e.g., J. Tlusty, *Machine Dynamics, Handbook of High Speed Machining Technology*: Chapman and Hall, NY, 1985; K. L. Cooke and P. van den Driessche, "On Zeros of Some Transcendental Equations," *Funkcialaj Ekvacioj*, vol. 29, pp. 77-90, 1986; and N. Olgac and M. Hosek, "A New Perspective and Analysis for Regenerative Machine Tool Chatter," *International Journal of Machine Tools & Manufacture*, vol. 38, pp. 783-798, 1998. For present purposes, however, it is shown how the CTCR paradigm of the present disclosure may be used to map/control chatter in such system, step by step:
 (i) Take "b" as a fixed parameter
 (ii) Use the Rekasius substitution of (7)

$$e^{-\tau s} = \frac{1-Ts}{1+Ts}$$

in (20) to obtain $$\overline{CE}(s, b, T) = (1+Ts)(s^2 + 40s + 400000 + 13680805.73b) - \qquad (21)$$
$$13680805.73b(1-Ts) =$$
$$Ts^3 + (40T+1)s^2 + [40 + (400000 + 27361611.46b)T]s +$$
$$400000 = b_3(T,b)s^3 + b_2(T,b)s^2 + b_1(T,b)s + b_0 = 0$$

where $b_j(T, b)$, $j=0 \ldots 3$ are self evident expressions.
 (iii) Search for the values of T, which render $s=\omega i$ as a root for (21), using Routh's Array.

$$\begin{array}{c|cc} s^3 & b_3 & b_1 \\ s^2 & b_2 & b_0 \\ s^1 & \dfrac{b_2 b_1 - b_0 b_3}{b_2} & \\ s^0 & b_0 & \end{array}$$

The Routh's array (b and T arguments are suppressed)
 (iv) Apply the standard rules of Routh's array dictating that the only term in $s^1$ row to be zero for equation (21) to possess a pair of imaginary roots.

$$b_2 b_1 - b_3 b_0 = 0, \; b_2 > 0 \qquad (22)$$

Equation (21) gives a quadratic equation in T for a given chip width, b, which results in at most two (2) real roots for T. If these roots $T_1$, $T_2$ are real, further analysis is required. For those real T values, the imaginary characteristic roots of (21) will be:

$$s_j = \omega_j i = \sqrt{\frac{b_o}{b_2}}\bigg|_j = \sqrt{\frac{b_1}{b_3}}\bigg|_j, \text{ with } T = T_j, j = 1,2 \qquad (23)$$

These are the only two imaginary roots (representing the two chatter frequencies) that can exist for a given "b" value. If $T_1$, $T_2$ are complex conjugate numbers for a value of b, it implies that there is no possible imaginary root for equation (20), regardless of $\tau \in \Re^+$. In other words, this depth-of-cut causes no stability switching for any spindle speed, N>0.
 (v) Using equation (8), the $\tau$ values corresponding to these $(T_1, \omega_1)$ and $(T_2, \omega_2)$ pairs are determined. There are infinitely many $\tau_{1j}$ and $\tau_{2j}$, $j=0, 1, 2, \ldots$, respectively, according to equation (8). As per the definition of kernel, following equation (6), the smallest values of these $\tau_1$ and $\tau_2$ form the two-point kernel for this case. For instance, b=0.005 [m], these values are $$T_1 = -0.006142 \; T_2 = -0.0003032$$

$$\omega_1 = 728.21 \text{ rad/s} \; \omega_2 = 636.33 \text{ rad/s}$$

$$\tau_1 = 0.0049 \text{ s} \; \tau_2 = 0.0093 \text{ s} \qquad (24)$$

The first "clustering" is already at hand. For b=0.005, the kernel consists of two discrete points (as opposed to a curve in two-delay cases, such as Case Study I), namely $\tau_1=0.0049$ s and $\tau_2=0.0093$ s, for which the characteristic equation has two imaginary roots. And these are the only two imaginary roots that any $\tau \in \Re^+$ can ever produce (again for b=0.005). Each $\tau_1$ (or $\tau_2$) resulting in $\omega_1$ (or $\tau_2$) also describe a set of countably infinite delay sets, called the "offspring" of the original $\tau_1$ (or $\tau_2$). They are given by equation (8) in single delay domain as:

$$\tau_{1j} = \tau_1 + \frac{2\pi}{\omega_1} j$$

with the cluster identifier $\omega_1 = 728.21$ rad/s, $j=1, 2, \ldots$ $$\tau_{2j} = \tau_2 + \frac{2\pi}{\omega_2} j$$

with the cluster identifier $\omega_2 = 636.33$ rad/s, $j=1, 2, \ldots$
The second "clustering" feature is slightly more subtle: the root tendencies associated with the transitions of $\tau$ are defined by $$\tau_{1j} - \epsilon \to \tau_{1j} \to \tau_{1j} + \epsilon \text{ are all RT}=+1 \text{ (i.e., destabilizing)}$$

$$\tau_{2j} - \epsilon \to \tau_{2j} \to \tau_{2j} + \epsilon \text{ are all RT}=-1 \text{ (i.e., stabilizing)}$$

For the invariance property for $\{\tau_{1j}\}$ cluster, every element renders the same $s=\omega_1 i$ characteristic root. The differential form of (19) is:

$$dCE(s, \tau, b) = \frac{\partial CE(s, \tau, b)}{\partial s} ds + \frac{\partial CE(s, \tau, b)}{\partial \tau} d\tau \qquad (25)$$
$$= (2ms + c + bC\text{Cos}\beta\tau e^{-\tau s}) ds +$$
$$bC\text{Cos}\beta s e^{-\tau s} d\tau$$
$$= 0$$

which results in:

$$\frac{ds}{d\tau} = -\frac{bC\text{Cos}\beta s e^{-\tau s}}{2ms + c + bC\text{Cos}\beta\tau e^{-\tau s}} \qquad (26)$$

Two features in this expression are of note: (i) $e^{-\tau s}$ remains unchanged for $s=\omega_1 i$ and $\tau = \tau_{1j}$, $j=0, 1, 2, \ldots$, and (ii)

$$RT_1 = \text{Re}\left(\frac{ds}{d\tau}\right)\bigg|_{s=\omega_1 i}$$

is independent of $\tau$ (despite the varying s term in the denominator), and it is +1 for all $\tau_{1j}$, $j=0, 1, 2, \ldots$. The same invariance feature can be obtained for ($\tau_2$, $\omega_2$), but with stabilizing $RT_2=-1$. This proves the second clustering feature for this case study.

Based on the foregoing illustrative example/case study, it is clear that the stability posture of a system for a given b (say 0.005 m), and the deployment of CTCR is completed for this depth-of-cut (FIG. 9). The behavior of the invariant RT from points $C_1, C_1', C_1'', \ldots$ (all destabilizing) and $C_2, C_2', C_2'', \ldots$ (all stabilizing) as $\tau$ increases is noteworthy. As a consequence, the number of unstable roots, NU, can be declared in each region very easily (as sparingly shown on the figure). When NU=0, the cutting is stable. ($0<\tau<\tau_1$ stable, $\tau_1<\tau<\tau_2$ unstable, $r_2<\tau<\tau_1+2\pi/\omega_1$ stable, etc.; stability switchings occur). The stable intervals are marked with thicker/bolder line style for ease of recognition. If b∈[0 . . . 30 mm] is swept, the complete stability chart of FIG. 9 in delay domain is obtained.

Stable cutting appears below the dark curve (also referred to as the "chatter bound"). The conventional chatter stability lobes (as the machine tools community calls them) of FIG. 10 in the RPM domain can readily be obtained using $\tau=60/N$ coordinate conversion.

It is noted that for a given b=0.005 [m] chip width, there are a few pockets of spindle speeds [RPM] where the cutting is stable. This feature is very similar to the pockets in ($\tau_1,\tau_2$) space in FIG. 7a as one moves along a line representing a constant pitch ratio ($\tau_2/\tau_1$=constant). The problem is at least an order of magnitude more complex in systems that embody two-delay functionality, at least in part because the delays can influence the stability of the operation in conflicting directions. That is, increasing a delay may be stabilizing, while increasing the other is destabilizing at the same operating point ($\tau_1$, $\tau_2$), such as at point A of FIG. 7a. Increasing T implies increasing the corresponding pitch angles in the variable pitch milling. Another interesting point is that the two-delay problem in Case Study I reduces to that of one delay, if $\tau_2/\tau_1=n_2/n_1$, $n_1$, $n_2$=integers. For instance, when $n_2/n_1=11/7$, the constant pitch ratio line (as marked on FIG. 7a) is obtained. On this line, a stable-unstable-stable sequence is observed as $\tau_1$ (or $\tau_2$) increases.

With respect to the computational complexity of the disclosed operations for chatter stability mapping and/or control, the following CPU times from start to finish (including the graphical display of the chatter stability lobes) are noted according to exemplary embodiments of the present application:

Case Study I: 38.5 s
Case Study II: 0.5 s

Considering the complexity of Case Study I and the intensity of the information which can be extracted from it, the CPU loading is clearly reasonable for the benefits derived. All of these durations are obtained on a Pentium 4, 3.2 MHz, 512 MB RAM PC.

In conclusion, the present disclosure provides advantageous systems and methods for chatter stability prediction and/or control in simultaneous machining applications, including specifically machining applications that include multiple conventional milling spindles, single milling cutters with non-uniformly distributed cutter flutes, and other machining applications that are characterized, at least in part, by non-uniform pitch cutters, including single spindle machining applications that are characterized by such non-uniformity. The disclosed systems/methods utilize a CTCR procedure for determining the complete stability posture of regenerative chatter dynamics in simultaneous machining (SM), as defined herein. The disclosed systems/methods provide an exhaustive declaration of the stability regions and a complete set of chatter frequencies which can possibly occur for the given process.

According to exemplary embodiments of the present disclosure, a transformation, i.e., Rekasius substitution, is used which converts the common transcendental characteristic equation into algebraic form. The resulting tableau is unprecedented even in the mathematics community. The case studies provided herein: (i) follow a meticulous research effort of a respected group in the field on variable pitch milling process [Altintas et al.], and (ii) address the conventional single-tool-machining chatter using the disclosed systems/methods. As a whole, the present disclosure demonstrates that the CTCR paradigm, as employed in the disclosed systems and methods, can comfortably recreate the simpler and well-known results of stability lobes.

Although the systems and methods have been described with reference to exemplary embodiments thereof, the present disclosure is not to be limited to such exemplary embodiments. Rather, the disclosed systems and methods are susceptible to various modifications, enhancements and/or variations with departing from the spirit or scope of the present disclosure. Indeed, the present disclosure expressly encompasses such modifications, enhancements and/or variations within its scope.

The invention claimed is:

1. A method for facilitating chatter stability mapping in a simultaneous machining (SM) application, the method comprising:
   a. deriving a characteristic equation for a SM application, the SM application operating on a single workpiece and including at least a plurality of tool-workpiece interfaces, wherein the characteristic equation includes one or more selectively variable operating parameters for each of the plurality of tool-workpiece interfaces and wherein the characteristic equation accounts for any cross-talk between the tool-workpiece interfaces; and
   b. applying a cluster treatment of characteristics roots (CTCR) paradigm to the characteristic equation to calculate one or more sets of values for the one or more selectively variable operating parameters which result in chatter.

2. The method according to claim 1, wherein the SM application involves variable pitch milling and wherein the one or more selectively variable operating parameters include pitch angle.

3. The method according to claim 1, wherein the one or more selectively variable operating parameters include at least one parameter selected from the group consisting of: spindle speed and chip width.

4. The method according to claim 1, wherein a processing system is adapted to effectuate the applying the CTCR paradigm to the characteristic equation.

5. The method according to claim 1, wherein the characteristic equation is a parameterized quasi-polynomial with multiple time delays.

6. The method according to claim 5, wherein the characteristic equation includes a dynamic influence transfer function which reflects any auto-coupling and cross-coupling effects between a cutting force vector and a vector representing tool displacements in a depth-of-cut direction.

7. The method according to claim 6, wherein the cutting force directions are time varying and periodic in nature and wherein the cutting force directions are represented in the characteristic equation via time-invariant Fourier expansions thereof.

8. The method according to claim 5, wherein the characteristic equation includes an exponential diagonal matrix representing the multiple time delays.

9. The method according to claim 5, wherein the characteristic equation includes terms representing cross-talk between the multiple time delays.

10. The method according to claim 5, wherein the characteristic equation includes a diagonal matrix representing an influence of chip width and cutting force constants.

11. The method according to claim 5, wherein the characteristic equation is:

$$CE(s,\tau,B) = det[I + G(s)BC_{diag}(I - e_{diag}^{-\tau s})] = 0$$

wherein, $G(s)$ is a dynamic influence transfer function which reflects auto-coupling and cross-coupling effects between a cutting force vector and a vector representing tool displacements in a depth-of-cut direction, $BC_{diag}$ is a diagonal matrix representing an influence of chip width and cutting force constants, and $e_{diag}^{-\tau s}$ is an exponential diagonal matrix representing the multiple time delays.

12. The method according to claim 1, further comprising using a control system to automatically control operation of the SM application so as to avoid the one or more sets of values for the operating parameters which result in chatter.

13. The method according to claim 1, wherein the SM application involves at least one of: (i) multiple milling operations, (ii) multiple boring operations, (iii) multiple turning operations, (iv) one or more spindles with non-uniformly distributed flutes, (v) one or more spindles with variable pitch cutters, and (vi) multiple spindles.

14. The method according to claim 1, further comprising optimizing the operating parameters with respect to material removal rate and chatter.

15. The method according to claim 1, wherein the chatter relates at least in part to regenerative chatter associated with the SM application.

16. The method according to claim 1, wherein the applying a cluster treatment of characteristics roots (CTCR) paradigm to the characteristic equation includes exhaustively calculating all sets of values for the one or more selectively variable operating parameters which result in purely imaginary characteristic roots for the characteristic equation.

17. The method according to claim 16, wherein the applying a cluster treatment of characteristics roots (CTCR) paradigm to the characteristic equation further includes detecting root tendencies for each of the imaginary characteristic roots with respect to one or more of the one or more selectively variable operating parameters.

18. The method according to claim 16, wherein the calculating all sets of operating parameter values which result in purely imaginary characteristic roots includes determining a kernel for the characteristic equation utilizing a Rekasius substitution or other transformation to convert any transcendental terms of the characteristic equation into algebraic form.

19. The method according to claim 18, wherein the calculating all sets of operating parameter values which result in purely imaginary characteristic roots further includes determining a plurality of offspring for said kernel.

* * * * *